(12) United States Patent
Osawa et al.

(10) Patent No.: US 11,122,544 B2
(45) Date of Patent: Sep. 14, 2021

(54) USER TERMINAL AND RADIO COMMUNICATION METHOD

(71) Applicant: NTT DOCOMO, INC., Tokyo (JP)

(72) Inventors: Ryosuke Osawa, Tokyo (JP); Hiroki Harada, Tokyo (JP); Yuichi Kakishima, Palo Alto, CA (US)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/609,426

(22) PCT Filed: May 1, 2017

(86) PCT No.: PCT/JP2017/017204
§ 371 (c)(1),
(2) Date: Oct. 29, 2019

(87) PCT Pub. No.: WO2018/203378
PCT Pub. Date: Nov. 8, 2018

(65) Prior Publication Data
US 2020/0059898 A1    Feb. 20, 2020

(51) Int. Cl.
*H04W 72/08* (2009.01)
*H04W 72/02* (2009.01)
*H04W 72/04* (2009.01)
*H04W 74/08* (2009.01)

(52) U.S. Cl.
CPC ......... *H04W 72/02* (2013.01); *H04W 72/042* (2013.01); *H04W 72/046* (2013.01); *H04W 72/08* (2013.01); *H04W 74/0833* (2013.01)

(58) Field of Classification Search
CPC . H04W 72/046; H04W 72/042; H04W 72/04; H04W 74/0833

USPC ......................................... 375/267, 347, 349
See application file for complete search history.

(56) References Cited

U.S. PATENT DOCUMENTS

| | | | |
|---|---|---|---|
| 2004/0114552 A1* | 6/2004 | Lim | H04B 7/2041 370/324 |
| 2014/0010178 A1* | 1/2014 | Yu | H04W 74/0833 370/329 |
| 2015/0181485 A1 | 6/2015 | Son et al. | |
| 2015/0236772 A1* | 8/2015 | Hammarwall | H04L 5/0048 370/329 |

(Continued)

FOREIGN PATENT DOCUMENTS

| | | | |
|---|---|---|---|
| JP | 2010-171649 A | 8/2010 | |
| JP | 2014531852 A | 11/2014 | |

(Continued)

OTHER PUBLICATIONS

International Search Report issued in PCT/JP2017/017204 dated Aug. 8, 2017 (2 pages).

(Continued)

*Primary Examiner* — Emmanuel Bayard
(74) *Attorney, Agent, or Firm* — Osha Bergman Watanabe & Burton LLP

(57) ABSTRACT

A terminal is disclosed including a processor and a transmitter. The processor determines, based on a threshold of a criterion, a beam having the criterion that is equal to or greater than the threshold. Further, the transmitter transmits a random access preamble based on the determined beam. In other aspects, a radio communication method for a terminal is also disclosed.

5 Claims, 7 Drawing Sheets

(56) References Cited

U.S. PATENT DOCUMENTS

| | | | |
|---|---|---|---|
| 2015/0245346 A1* | 8/2015 | Yokomakura | H04L 5/00 |
| | | | 370/329 |
| 2016/0113023 A1* | 4/2016 | Zhou | H04W 76/30 |
| | | | 370/329 |
| 2016/0157267 A1* | 6/2016 | Frenne | H04B 7/086 |
| | | | 370/329 |
| 2016/0352403 A1 | 12/2016 | Kishiyama et al. | |
| 2016/0353510 A1* | 12/2016 | Zhang | H04B 7/0617 |
| 2017/0026962 A1 | 1/2017 | Liu et al. | |
| 2017/0202029 A1* | 7/2017 | Qi | H04W 76/10 |
| 2017/0302353 A1* | 10/2017 | Rahman | H04B 7/0478 |
| 2017/0332359 A1* | 11/2017 | Tsai | H04B 7/0639 |
| 2017/0339662 A1* | 11/2017 | Lin | H04B 7/0695 |
| 2018/0027424 A1* | 1/2018 | Chen | H04W 24/02 |
| | | | 455/450 |
| 2018/0092129 A1* | 3/2018 | Guo | H04W 56/001 |
| 2018/0115958 A1* | 4/2018 | Raghavan | H04B 7/0834 |
| 2018/0139787 A1* | 5/2018 | Islam | H04L 5/0053 |
| 2018/0176958 A1* | 6/2018 | Islam | H04W 74/0833 |
| 2018/0199328 A1* | 7/2018 | Sang | H04B 7/022 |
| 2019/0058517 A1* | 2/2019 | Kang | H04L 5/0048 |
| 2019/0104549 A1* | 4/2019 | Deng | H04L 27/2607 |
| 2019/0208547 A1* | 7/2019 | Koskela | H04B 7/0617 |
| 2019/0253116 A1* | 8/2019 | Priyanto | H04B 7/0695 |
| 2019/0320355 A1* | 10/2019 | Da Silva | H04W 16/28 |
| 2019/0327634 A1* | 10/2019 | Lee | H04W 24/08 |
| 2019/0356524 A1* | 11/2019 | Yi | H04B 7/0617 |
| 2020/0059967 A1* | 2/2020 | Kim | H04W 72/0446 |
| 2020/0084089 A1* | 3/2020 | Da Silva | H04L 5/0048 |
| 2020/0084754 A1* | 3/2020 | Tsai | H04W 68/02 |
| 2020/0196173 A1* | 6/2020 | Da Silva | H04W 36/0094 |

FOREIGN PATENT DOCUMENTS

| | | |
|---|---|---|
| WO | 2015/119076 A1 | 8/2015 |
| WO | 2017012472 A1 | 1/2017 |

OTHER PUBLICATIONS

Written Opinion of the International Searching Authority issued in PCT/JP2017/017204 dated Aug. 8, 2017 (3 pages).

ETSI TS 136 300 V8.12.0; "LTE; Evolved Universal Terrestrial Radio Access (E-UTRA) and Evolved Universal Terrestrial Radio Access Network (E-UTRAN); Overall description; Stage 2 (3GPP TS 36.300 version 8.12.0 Release 8)"; Apr. 2010; (153 pages).

Office Action issued in Japanese Application No. 2019-516318; dated Apr. 13, 2020 (13 pages).

Extended European Search Report in counterpart European Application No. 17908273.0 dated Sep. 23, 2020 (12 pages).

Nokia et al; "Impact of UE TX/RX Beam correspondence and non-correspondence"; 3GPP TSG-RAN WG1#87, R1-1612298; Reno, U.S.A.; Nov. 14-18, 2016 (6 pages).

Zte et al; "4-step RA Procedure"; 3GPP TSG RAN WG1 #88bis Meeting, R1-1704365; Spokane, USA; Apr. 3-7, 2017 (16 pages).

* cited by examiner

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of long term evolution (LTE) have been drafted for the purpose of further increasing high speed data rates, providing lower latency and so on (see non-patent literature 1). In addition, LTE-A (LTE advanced and LTE Rel. 10, 11, 12 and 13) has been standardized for the purpose of achieving increased capacity and enhancement beyond LTE (LTE Rel. 8 and 9).

Successor systems of LTE are also under study (for example, referred to as "FRA (Future Radio Access)," "5G (5th generation mobile communication system)," "5G+ (plus)," "NR (New Radio)," "NX (New radio access)," "FX (Future generation radio access)," "LTE Rel. 14 or 15 and later versions," etc.).

In existing LTE systems (for example, LTE Rel. 8 to 13), a user terminal (UE (User Equipment)) may apply precoding to transmitting signals, per transmitting antenna, based on precoding matrix indicators (PMIs) given as feedback from the network (for example, a base station (eNB (eNode B))), and transmit these signals.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall Description; Stage 2 (Release 8)," April, 2010

SUMMARY OF INVENTION

Technical Problem

Envisaging future radio communication systems (for example, NR), studies are in progress to use beamforming (BF) for both transmission and receipt mainly for the purpose of making it less difficult to secure coverage even when the carrier frequency increases, and reducing the propagation loss of radio waves.

As for the method of selecting beams, two types of operations may be possible—that is, either UE makes autonomous selections, or a base station makes selections and sends commands to the UE. In the former case, the problem is that transmitting beams which the UE selects freely can be a source of interference against other UEs and/or other cells. In this case, the quality of communication, as well as communication throughput, may deteriorate unexpectedly.

It is therefore an object of the present invention to provide a user terminal and a radio communication method, whereby, even when UE is allowed to select beams, it is possible to reduce the decline in communication throughput and so forth.

Solution to Problem

According to one aspect of the present invention, a user terminal has a receiving section that receives determining information for determining policies in autonomous selection of transmitting beams, a control section that selects, as a transmitting beam, a beam where a measurement result of a predetermined criterion fulfills a predetermined condition, based on the determining information, and a transmission section that transmits a signal using the selected transmitting beam.

Advantageous Effects of Invention

According to the present invention, even when UE is allowed to select beams, it is possible to reduce the decline in communication throughput and so forth.

DESCRIPTION OF EMBODIMENTS

Figure 1:
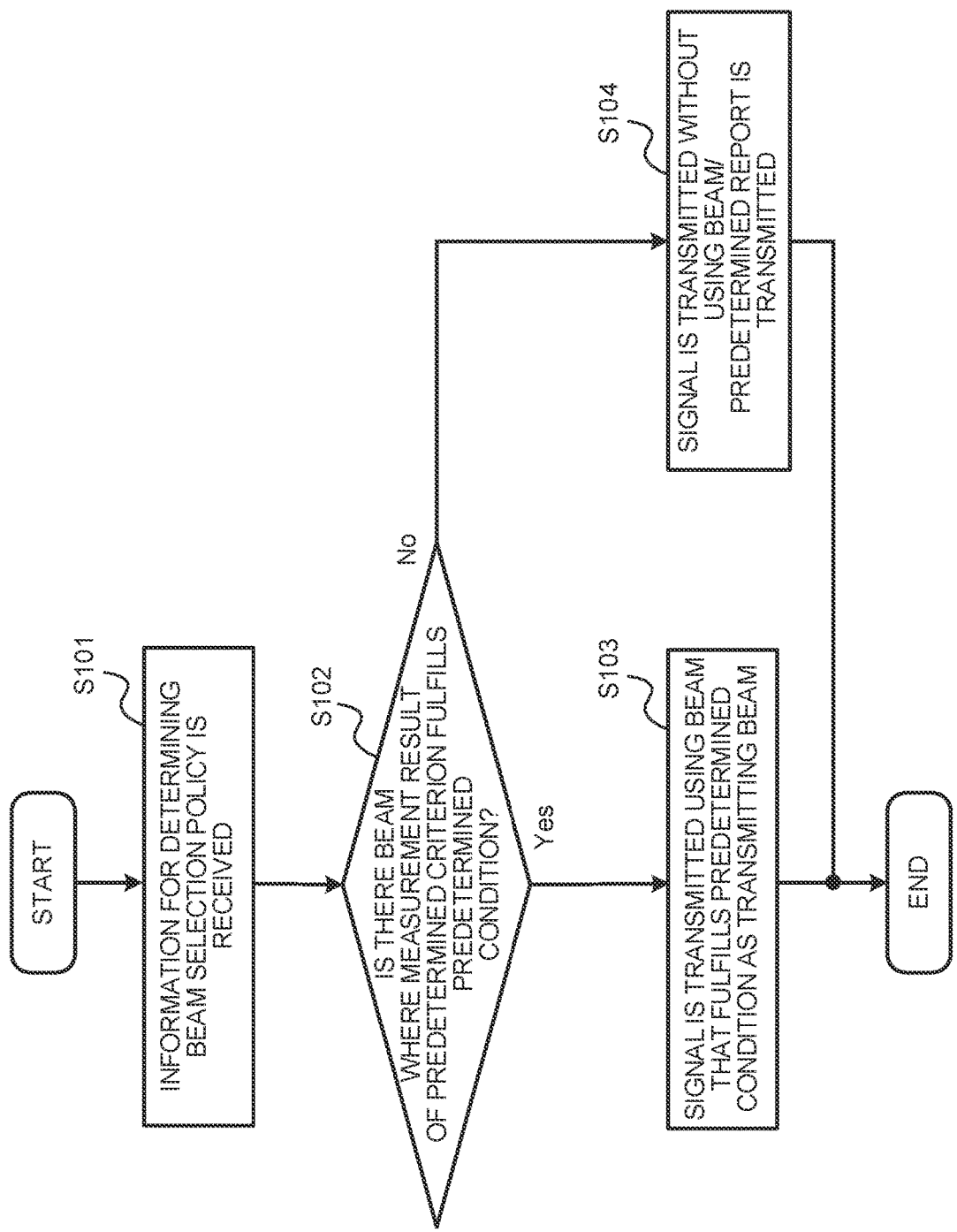
FIG. 1 is a diagram to show a sample flowchart of transmitting beam selection by UE, according to the first embodiment of the present invention.

Envisaging future radio communication systems (for example, NR), studies are in progress to use beamforming (BF) for both transmission and receipt mainly for the purpose of making it less difficult to secure coverage even when the carrier frequency increases, and reducing the propagation loss of radio waves. Assuming that a very large number of antenna elements are used, BF refers to the technique of forming beams (antenna directivities) by, for example, adjusting the amplitude and/or the phase of signals transmitted/received in each element (also referred to as "precoding"). Note that such MIMO (Multiple Input Multiple Output) to use a very large number of antenna elements is also referred to as "massive MIMO."

BF can be classified into digital BF and analog BF. Digital BF refers to a method of performing precoding signal processing on the baseband (for digital signals). Analog BF refers to a method of using phase shifting devices on RF. Analog BF only rotates the phase of RF signals and therefore can be realized based on simple and inexpensive configurations, although it cannot form a plurality of beams at the same time. Note that it is also possible to implement a hybrid BF configuration that combines digital BF and analog BF.

Envisaging NR, studies are underway to allow both a base station (which may be referred to as a "BS," "transmission/reception point (TRP)," an "eNB (eNode B)," a "gNB" and so forth) and UE to form transmitting/receiving beams and achieve gains.

Transmitting beams and/or receiving beams may be selected based on, for example, propagation path information that is estimated using reference signals. The reference signals may include, for example, cell-specific reference signals (CRSs), channel state information-reference signals (CSI-RSs), measurement reference signals (such as sounding reference signals (SRSs)) and so forth, or reference signal that are defined apart from these (for example, beam-specific reference signals (BRSs), which are beam-specific (which vary per beam)) may be used.

The propagation path information is, for example, channel state information (CSI), information related to channel characteristics and/or channel matrix. Note that the propagation path information may include the transmitter/receiver characteristics of the UE and the gNB, phase and/or amplitude adjustment results for beam forming, and so on. Here, the transmitter/receiver characteristics refer to, for example, the frequency characteristics (for example, phase and/or amplitude characteristics) of the transmitter/receiver.

Note that the propagation path information may include at least one of a channel quality indicator (CQI), a precoding matrix indicator (PMI), a precoding type indicator (PTI), a rank indicator (RI), a port index for a predetermined reference signal, a resource indicator (for example, an SRS resource index (SRI) for a predetermined reference signal, and so on. Note that a PMI and an RI determined by the gNB may be referred to as a "TPMI (Transmitted PMI)" and a "TRI (Transmitted RI)," respectively.

The gNB may receive uplink reference signals transmitted from the UE, perform channel estimation and so on based on the uplink reference signals, and derive uplink and/or downlink propagation path information. The UE may receive downlink reference signals transmitted from the gNB, perform channel estimation and so on based on the downlink reference signals, and derive uplink and/or downlink propagation path information.

It is preferable if the gNB and the UE can specify which beam the communicating party is using. For example, the gNB and the UE may share information about the combinations of paired transmitting/receiving beams (combinations of transmitting beams used on the transmitting side and receiving beams used on the receiving side). In this case, the gNB may report (indicate) a beam pair to the UE, and the UE may use the transmitting beam corresponding to the reported beam pair for transmission (and/or use the receiving beam for receipt). A combination of paired transmitting/receiving beams may be referred to as a "beam pair link (BPL)."

Information about the combinations of paired transmitting/receiving beams may be reported to the UE and/or the gNB by using higher layer signaling (for example, RRC signaling, Medium Access Control (MAC) signaling (for example, MAC CE (Control Element)), broadcast information, etc.), physical layer signaling (for example, downlink control information (DCI), uplink control information (UCI), etc.) and so on, or by combining these.

Note that, in this specification, a beam is distinguished (differences between multiple beams are judged) based on, but not limited to, at least one of following (1) to (8):

(1) resource (for example, the time and/or frequency resources used, the number of resources, etc.);

(2) antenna port (for example, the port index of the DMRS (DeModulation Reference Signal) and/or the measurement reference signal (SRS (Sounding Reference Signal), the number of ports, the resource corresponding to the port, etc.);

(3) precoding (for example, whether or not precoding is applied, precoding weight, etc.);

(4) transmission power;

(5) phase rotation;

(6) beam widths;

(7) beam angles (for example, tilt angle); and (8) the number of layers.

Also, the term "beam" as used herein may be used interchangeably with at least one of (1) to (8) listed above, and, for example, a "beam" may be interpreted as meaning a "resource," an "antenna port," a "DMRS port," an "SRS port," a "reference signal antenna port" and so on. Also, a "beam" may be interpreted as meaning "transmitting beam and/or receiving beam."

A beam may be specified by a beam index (BI), a PMI, a TPMI, a predetermined reference signal's port index (for example, a DMRS port index (DPI), an SRS port index (SPI), etc.), a predetermined reference signal's resource indicator (for example, CSI-RS resource indicator (CRI), DMRS resource index (DRI), SRS resource index (SRI), etc.) and so on.

Now, envisaging NR, research is underway to support codebook transmission (codebook-based transmission) and non-codebook transmission (non-codebook-based transmission). In general, since codebooks are designed without considering antenna correlation, panel arrangement and/or others, and therefore codebook transmission is not always implemented with an optimal beam for every UE. Also, for example, when UE carries many transmitting antennas, non-codebook transmission is effective for generating beams that are not limited to codebooks (such as very thin beams).

In both codebook transmission and non-codebook transmission, UE's transmitting beams may be selected in two patterns—that is, (1) UE might make selections in a autonomous way, or (2) a gNB makes selections and report these to the UE. The above operation of (1) may be described using phrases like "UE-centric," "UE-centric mode," "UE-initiative control" and so forth, and the above operation of (2) may be described using phrases like "gNB-centric," "gNB-centric mode," "gNB-initiative control," "BS-centric" and so on.

In UE-centric operation, the UE may select transmitting beams and/or receiving beams for use, in a autonomous way. In this case, it is not necessary to report information related to transmitting beams and/or receiving beams (for example, BIs, TPMIs and so on, which have been mentioned earlier) from the gNB to the UE, so that the overhead can be reduced.

In UE-centric operation, the gNB may operate to assist the selection of beam in the UE. For this reason, UE-centric operation may be referred to as "gNB-assisted mode," "gNB-aided mode," and so on.

In gNB-centric operation, information related to transmitting beams and/or receiving beams (for example, information that indicates (specify) beams) may be reported from the gNB to the UE. This information about transmitting beams and/or receiving beams may be reported by using higher layer signaling (for example, RRC signaling) and/or physical layer signaling (for example, DCI), or by combining these. Although gNB-centric operation requires overhead to report beams for UEs, it is effective for control interference, ensure robustness and so on.

The gNB and/or the UE may determine whether gNB-centric and/or UE-centric operations are possible, based on information related to beam correspondence. Here, beam correspondence may refer to indicators to show the matching of transmitting beams and receiving beams, and may be referred to as, or described using phrases like, "transmitting/receiving beam correspondence (Tx/Rx beam correspondence)," "beam reciprocity," "beam calibration," "calibrated/non-calibrated," "reciprocity calibrated/non-calibrated," "the degree of correspondence," "the degree of matching," or simply "correspondence."

For example, as to how to judge whether or not there is correspondence, it may be determined that correspondence is "present" when a first beam (for example, a transmitting beam) and a second beam (for example, a receiving beam) match completely, or it may be determined that correspondence is "present" when the difference between both beams is within a predetermined threshold or within an allowable range. Also, the degree of correspondence may be a value that is calculated from the difference between both beams. Note that the difference between beams may be a difference that is derived from the beam specifying information, and may be, for example, at least one of the difference between beam indices, the difference between beam coefficients, the difference between beam angles, and so on.

If correspondence is found at the UE, the TRP (for example, the gNB) and/or the UE may assume that following conditions (1) and/or (2) are fulfilled:

(1) the UE can select transmitting beams which the UE might use for uplink transmission based on downlink measurements at the UE using one or more receiving beams of the UE; and (2) the UE can select receiving beams which the UE might use for downlink receipt, based on commands that are sent from the TRP based on uplink measurements at the TRP using one or more of the transmitting beams of the UE.

Also, if correspondence is found at the TRP, the TRP and/or the UE may assume that following conditions (3) and/or (4) are fulfilled:

(3) the TRP can select receiving beams which the TRP might use for uplink receipt based on downlink measurements at the UE using one or more transmitting beams of the TRP; and (4) the TRP can select transmitting beams which the TRP might use for downlink transmission based on uplink measurements at the TRP using one or more receiving beams of the TRP.

The information related to beam correspondence may be reported to the gNB and/or the UE by using higher layer signaling (for example, RRC signaling) and/or physical layer signaling (for example, DCI, UCI, etc.), or by combining these. If the UE has capabilities related to beam correspondence, the gNB and/or the UE may determine that the UE is capable of UE-centric operation. The UE may report UE capability information, which shows whether or not the UE has beam correspondence-related capabilities, to the gNB.

For example, studies are in progress on which reference signals should be used to select uplink transmitting beams when correspondence is found in the UE. However, even if correspondence is found in the UE and the reference signals to use for beam selection are indicated explicitly, the problem is that transmitting beams which the UE freely selects can be a source of interference against other UEs and/or other cells. In this case, the quality of communication, as well as communication throughput, may deteriorate unexpectedly.

So, the present inventors have come up with the idea of sending policies in beam selection from the gNB to the UE. According to one aspect of the present invention, for example, the impact of interference arising from UEs' transmitting beams can be reduced suitably.

Now, embodiments of the present invention will be described in detail below with reference to the accompanying drawings. The radio communication methods according to the herein-contained embodiments may be applied alone or may be applied in combination.

Note that "measurements" as used in the present specification may refer to measurements of at least one of RSRP (Reference Signal Received Power), RSRQ (Reference Signal Received Quality), RSSI (Received Signal Strength Indicator), SINR (Signal to Interference plus Noise Ratio), SNR (Signal to Noise Ratio), path loss, interference power and so forth, or measurements for determining other power and/or quality-related indicators.

Also, the following embodiments will show examples of selecting uplink transmitting beams for use for transmitting data (for example, a downlink shared channel (PUSCH (Physical Uplink Shared CHannel))). In other words, examples in which the channel to be subject to beam selection is the PUSCH, will be described below. However, as will be described later, the present invention is by no means limited to these. Also, a "channel" may be interpreted as meaning a "signal."

(Radio Communication Method)

<First Embodiment>

In the first embodiment of the present invention, UE selects uplink transmitting beams based on evaluation metrics (which may be referred to as "criteria") that are provided for use in uplink transmitting beam selection. FIG. 1 is a diagram to show a sample flowchart of transmitting beam selection by UE, according to the first embodiment.

Information for determining policies (rules) in autonomous selection of beams based on criteria (which may be referred to as "beam selection policy determining information," or simply "determining information" and the like) is reported from a gNB to the UE (step S101).

The information for determining policies in beam selection may be reported from the gNB to the UE by using higher layer signaling (for example, RRC signaling, MAC signaling, broadcast information (MIB and SIB), etc.) and/or physical layer signaling (for example, DCI), or by combining these.

The beam selection policy determining information may include information about criteria (for example, information for specifying criteria). The criteria may be comprised of any one or a combination of RSRP, RSRQ, RSSI, SINR, SNR, path loss, interference power, and other power and/or quality-related indicators, and the information of criteria may be used to specify at least one of these. Note that the number and types of criteria to use in beam selection may be determined in the specification.

The UE determines whether or not there is a beam where the measurement result of a predetermined criterion (a criterion specified in the specification or reported) meets a predetermined condition (step S102). The predetermined condition may be any one or a combination of the following:

(1) the measurement result of a predetermined criterion is the largest (or the smallest);

(2) the measurement result of a predetermined criterion is included in the top N (or the bottom N); and (3) the measurement result of a predetermined criterion is equal to or higher than (or equal to or lower than) a predetermined threshold. Note that the beam selection policy determining information may include information for specifying the predetermined condition.

When a beam fulfills the predetermined condition (step S102-Yes), the UE selects this beam as a transmitting beam and transmits a channel using this selected transmitting beam (step S103).

For example, if the RSRP is reported as a criterion, the UE may select the beam with the largest RSRP as a transmitting beam. If the RSRP is the criterion, the UE can, for example, suitably turn the transmitting beam in the direction of the serving base station, so that the possibility that the transmitting beam will be a source of interference to neighboring base stations, UEs under neighboring base stations and so forth can be reduced.

If the SINR, RSRQ, interference power and the like are used as criteria the UE can suitably reduce the interference power against neighboring base stations by, for example, directing null beams to neighboring base stations.

Note that information related to downlink measurement reference signals for measuring the RSRP, RSSI, path loss, SNR and so on may be reported to the UE. Also, information related to downlink reference signals for measuring interference such as the SINR, RSRQ, interference power and so on may be reported to the UE. The information related to these reference signals may be included in the determining information.

The information related to downlink reference signals for measuring interference may include, for example, information that indicates whether or not a downlink reference signal for measuring interference is used (or can be used), information that indicates the configuration of a downlink reference signal for measuring interference (which may be, for example, information to indicate the location of a time and/or frequency resource, an index for specifying the location of this resource, etc.) and so forth.

The information related to downlink measurement reference signals may be information related to a reference signal for measuring "S" of the SINR (for example, the power of signals from the serving cell). In addition, the information related to downlink reference signals for measuring interference may be information related to a reference signal for measuring "I" of the SINR (for example, the power of interference signals from neighbor cells).

Criteria may be reported to the UE in an implicit way, depending on which reference signals are used for measurements. The UE may determine based on which criterion, included in a first criteria set (for example, a set of SINR, RSRQ and interference power) or in a second criteria set (for example, a set of RSRP and path loss), the UE selects transmitting beams, based on, for example, whether or not information related to downlink reference signals for measuring interference is reported (in other words, whether or not downlink reference signals for measuring interference are used in measurements). When using a downlink reference signal for measuring interference, the UE may select a transmitting beam based on a criterion included in the first criteria set.

When the predetermined condition is above (2), the top N above may be selected based on numbers specified by the number of SRS resources, the number of antenna ports and the like. The above condition (2) may be used when the UE uses multiple beams or when sweeping prospective beams.

When the predetermined condition is above (3), the above-described criterion-related information may include a threshold for one criterion or thresholds for a number of thresholds. For example, by setting an threshold for the RSRP, it is possible to disallow UEs that are a certain distance or more apart from the serving base station (in other words, closer to neighboring base stations) to select transmitting beams in a autonomous way. By this means, it is possible to reduce the possibility that UEs' transmitting beams become a source of interference against neighboring base stations, UEs under neighboring base stations, and so forth.

When there is no prospective beam to meet the above predetermined condition (step S102-No), the UE may transmit the channel to be subject to beam selection, without using a beam (step S104). Also, in this case, the UE may transmit a predetermined report to the base station (step S104). This predetermined report may be a report to the effect that no prospective beam fulfills the condition, or may be a report to the effect that the UE has failed to select a transmitting beam in a autonomous way.

Note that the UE may transmit this predetermined report in a cell (CC, carrier, etc.) other than the cell where the criterion has been measured (the cell may be an NR cell or a cell using another non-NR RAT, such as LTE).

Also, when there is no prospective beam to fulfill the condition, the UE may transmit the above predetermined report in a channel other than the channel subject to beam selection. For example, given that the channel that is subject to beam selection is the PUSCH according to the present embodiment, the UE may transmit the predetermined report in a different channel such as the PUCCH, the PRACH, and so on. The predetermined report may be transmitted in the form of explicit information, or may be transmitted in an implicit way (for example, by transmitting a signal using a predetermined resource, transmission sequence, scrambling ID and the like).

Also, when no prospective beam fulfills the condition, the UE may operate so as to transmit the predetermined report once in an arbitrary beam, and then wait to transmit the beam selection-target channel until a command (for example, information to specify a transmitting beam) is received from the base station. Also, when no prospective beam fulfills the condition, the UE may suspend all transmissions, not only the channel that is subject to beam selection, and perform beam recovery operation after the suspension. The UE may request an RRC reconnection (for example, the UE may transmit an RRC connection re-establishment request to the base station).

When the base station learns that there was no prospective beam to fulfill the predetermined condition in the UE, the base station may, for example, report predetermined DCI (PDCCH order) that specifies a preamble and/or resource, to the UE, in order to allow the UE to start non-contention-based random access procedures.

Note that the UE may select a transmitting beam based on a number of criteria. In this case, information about multiple criteria may be reported to the UE as criterion information. Also, prospective criteria may be set forth in advance in the specification, or information to indicate prospective criteria may be reported to the UE. Note that the UE may transmit, to the base station, information to indicate based on which criterion the transmitting beam has been selected.

The UE may, for example, select one or more criteria to use in transmitting beam selection from prospective criteria based on the priority of each criterion. For example, when the priority of SINR is higher than the priority of RSRP and two beams show the same RSRP measurement result, if SINR measurement results are available, the UE may select the beam with the better SINR measurement result as a transmitting beam. The priorities of criteria may be defined in the specification in advance, or information to show the priorities of criteria may be reported to the UE.

Note that, if determining information is reported in step S101, the UE may start a timer of a duration, during which the UE can select transmitting beams in a autonomous way. Information about this timer (for example, information to show its duration, information as to whether or not to start the timer, and so forth) may be included in the determining information.

For example, assume a case where determining information designates RSRP as a criterion and commands to activate a timer of a certain duration. In this case, the UE may be controlled to start the timer, select beams based on RSRP, in a autonomous way, for a certain period, and not to select beams in a autonomous way after the timer expires.

Also, as for the criterion for use in autonomous selection of beams, a default criterion may be defined (or indicated). In this case, the UE may overwrite the default criterion for a certain period based on determining information received. For example, assume a case where, when SINR is the default criterion, determining information designates RSRP as a criterion and activates a timer of a certain duration. In this case, the UE may be controlled to start the timer, select beams based on RSRP, in a autonomous way, for a certain period, and select beams based on SINR, in a autonomous way, after the timer expires.

Also, the above timer may be a prohibit timer that prohibits autonomous selection of beams for a predetermined period. For example, assume a case where the UE is commanded to activate a prohibit timer of a certain duration. In this case, the UE may be controlled to start the timer, not to select beams in a autonomous way for a certain period, and to select beams in a autonomous way after the timer expires.

According to the first embodiment described above, for example, by setting certain conditions on autonomous selection of transmitting beams by UEs, it is possible to suitably reduce the possibility that UEs' transmitting beams become a source of interference to neighboring base stations, UEs under neighboring base stations and so forth.

<Second Embodiment>

A second embodiment of the present invention relates to the performance of autonomous beam selection by UE such as that described above with the first embodiment. The performance of autonomous beam selection can be defined by any one or a combination of the following indicators:

(1) compared with the case where beams are selected randomly, the throughput that is measured (or estimated) upon autonomous selection of beams surpasses a predetermined criterion (for example, a predetermined value and/or a predetermined ratio);

(2) compared with the case where beams are selected randomly, the received power and/or the SINR that are found at the receiving side (for example, the base station side) upon autonomous selection of beams surpasses a predetermined criterion (for example, a predetermined value and/or a predetermined ratio); and (3) at the receiving side (for example, gNB side), the spread of a transmitting beam from the transmitting side (for example, the UE side) stays within a predetermined angle from the arriving angle (AoA (Angle of Arrival)) of the transmitting beam. Note that this "spread" may refer to the main lobe's spread, width, etc.

The expression "surpass (or stay within)" as used in these indicators may be interpreted as meaning "the probability of surpassing (or staying within) is equal to or greater than, or lower than, a predetermined probability. For example, regarding the indicator of (2) above, the condition that the probability the SINR upon autonomous beam selection surpasses the SINR upon random selection of beams by 3 dB or more is 90% or higher may be used.

Also, for example, for the indicator of (3) above, the condition that "the beam gain of a transmitting beam from the transmitting side is not equal to or greater than Y dB on the receiving side in areas beyond X degrees from the arriving angle of the transmitting beam (or the probability that the beam gain reaches Y dB is equal to or lower than a predetermined probability (for example, 10%))" may be used. The above indicator (3) can be examined by, for example, installing a measuring instrument on a plane or on a spherical surface at a location a certain distance from the transmitting side, and checking the measurement results found there.

Note that the above defined values for performance (for example, a predetermined criterion, a predetermined value such as a predetermined angle and so forth) may vary depending on UEs' capabilities, categories, levels and the like. For example, the performance of autonomous beam selection performed by UE that is capable of transmitting thin beams may be defined different from the performance of autonomous beam selection performed by UE that is capable of transmitting thick beams.

(Variations)

The above-described embodiments have assumed that transmitting beams selected by UEs in a autonomous way are used to transmit data (PUSCH), but this is by no means limiting. For example, transmitting beams that are selected by UEs in a autonomous way may be used to transmit other uplink signals (for example, SRS) and/or channels (for example, PUCCH, PRACH, etc.).

Also, the above-described embodiments may be applied independently or applied in common, depending on what the type and/or use of each signals is (for example, a signal may be used in control (such as the PUCCH), random access procedures (such as the PRACH), data transmission (such as the PUSCH) and so on). For example, UE may not select the transmitting beam for the PUCCH in a autonomous way, but may select the transmitting beam for the PUSCH based on a criterion configured from the base station.

(Radio Communication System)

Now, the structure of the radio communication system according to one embodiment of the present invention will be described below. In this radio communication system, communication is performed using one of the radio communication methods according to the herein-contained embodiments of the present invention, or a combination of these.

Figure 2:
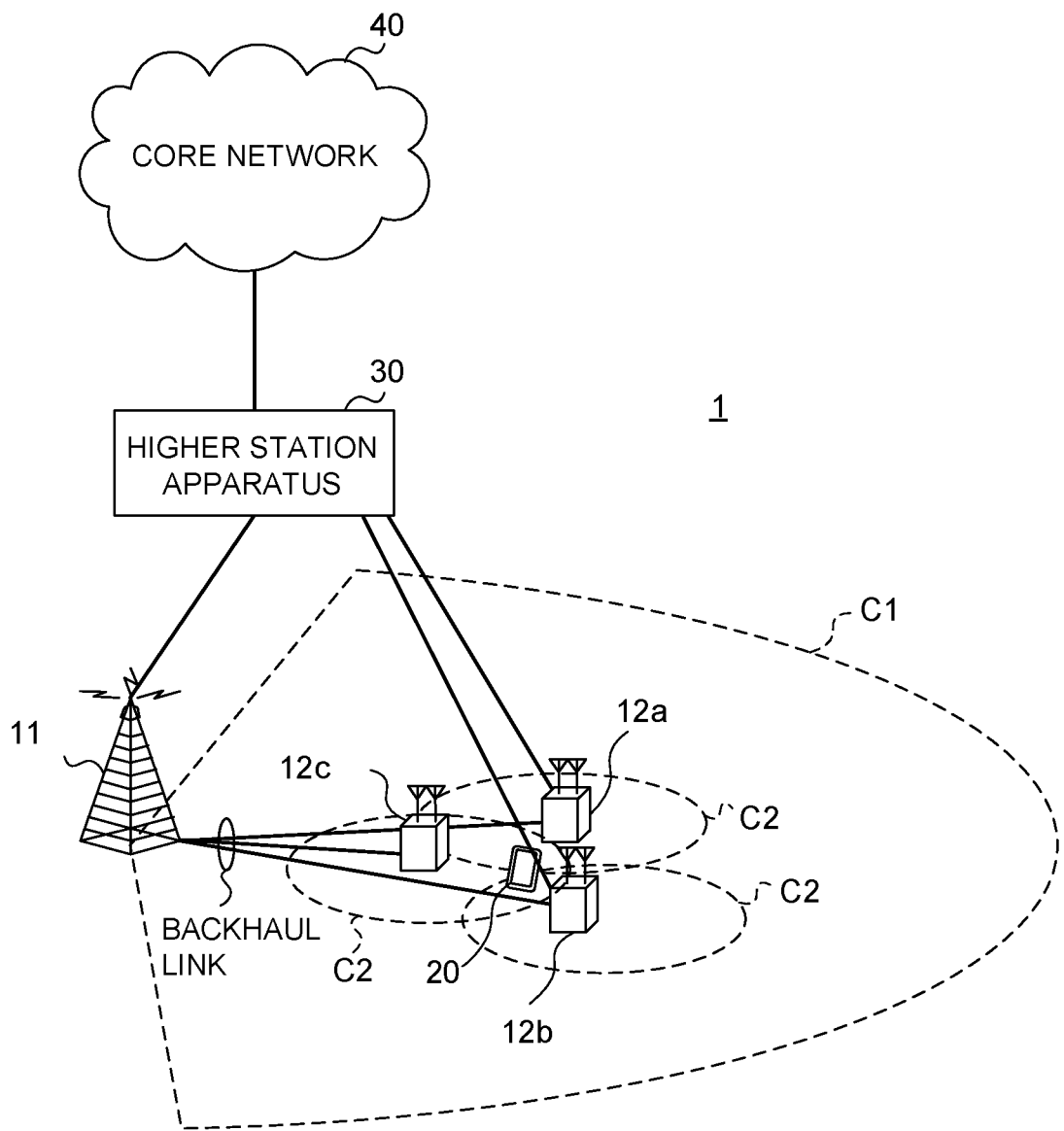
FIG. 2 is a diagram to show an exemplary schematic structure of a radio communication system according to one embodiment of the present invention.

FIG. 2 is a diagram to show an example of a schematic structure of a radio communication system according to one embodiment of the present invention. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "NR (New Radio)," "FRA (Future Radio Access)," "New-RAT (Radio Access Technology)" and so on, or may be seen as a system to implement these.

The radio communication system 1 includes a radio base station 11 that forms a macro cell C1, and radio base stations 12 (12a to 12c) that are placed within the macro cell Cl and that form small cells C2, which are narrower than the macro cell C1. Also, user terminals 20 are placed in the macro cell C1 and in each small cell C2. The arrangements and the number of cells and user terminals 20 are not limited to the examples illustrated in the drawing.

The user terminals 20 can connect with both the radio base station 11 and the radio base stations 12. The user terminals 20 may use the macro cell C1 and the small cells C2 at the same time by means of CA or DC. Furthermore, the user terminals 20 may apply CA or DC using a plurality of cells (CCs) (for example, five or fewer CCs or six or more CCs).

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the structure of the frequency band for use in each radio base station is by no means limited to these.

Furthermore, the user terminal 20 can communicate using time division duplexing (TDD) and/or frequency division duplexing (FDD) in each cell. Furthermore, in each cell (carrier), a single numerology may be employed, or a plurality of different numerologies may be employed.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmission/reception point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmission/reception points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-FDMA) and/or OFDMA are applied to the uplink.

OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that, uplink and downlink radio access schemes are not limited to these combinations, and other radio access schemes may be used.

In the radio communication system 1, a downlink shared channel (PDSCH (Physical Downlink Shared CHannel)), which is used by each user terminal 20 on a shared basis, a broadcast channel (PBCH (Physical Broadcast CHannel)), downlink L1/L2 control channels and so on are used as downlink channels. User data, higher layer control information, SIBs (System Information Blocks) and so on are communicated in the PDSCH. Also, the MIB (Master Information Block) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. The PDCCH communicates, for example, downlink control information (DCI) that includes PDSCH and/or PUSCH scheduling information, and so on.

Note that scheduling information may be reported in DCI. For example, DCI to schedule receipt of DL data may be referred to as a "DL assignment," and DCI to schedule UL data transmission may also be referred to as a "UL grant."

The number of OFDM symbols to use for the PDCCH is communicated by the PCFICH. HARQ (Hybrid Automatic Repeat reQuest) delivery acknowledgment information (also referred to as, for example, "retransmission control information," "HARQ-ACKs," "ACK/NACKs," etc.) in response to the PUSCH is transmitted by the PHICH. The EPDCCH is frequency-division-multiplexed with the PDSCH (downlink shared data channel) and used to communicate DCI and so on, like the PDCCH.

In the radio communication system 1, an uplink shared channel (PUSCH (Physical Uplink Shared CHannel)), which is used by each user terminal 20 on a shared basis, an uplink control channel (PUCCH (Physical Uplink Control CHannel)), a random access channel (PRACH (Physical Random Access CHannel)) and so on are used as uplink channels. User data, higher layer control information and so on are communicated by the PUSCH. Also, in the PUCCH, downlink radio quality information (CQI (Channel Quality Indicator)), delivery acknowledgment information, scheduling requests (SRs) and so on are communicated. By means of the PRACH, random access preambles for establishing connections with cells are communicated.

In the radio communication system 1, cell-specific reference signals (CRSs), channel state information reference signals (CSI-RSs), demodulation reference signals (DMRSs), positioning reference signals (PRSs) and so on are communicated as downlink reference signals. Also, in the radio communication system 1, measurement reference signals (SRSs (Sounding Reference Signals)), demodulation reference signals (DMRSs) and so on are communicated as uplink reference signals. Note that the DMRSs may be referred to as "user terminal-specific reference signals (UEspecific reference signals)." Also, the reference signals to be communicated are by no means limited to these.

(Radio Base Station)

Figure 3:
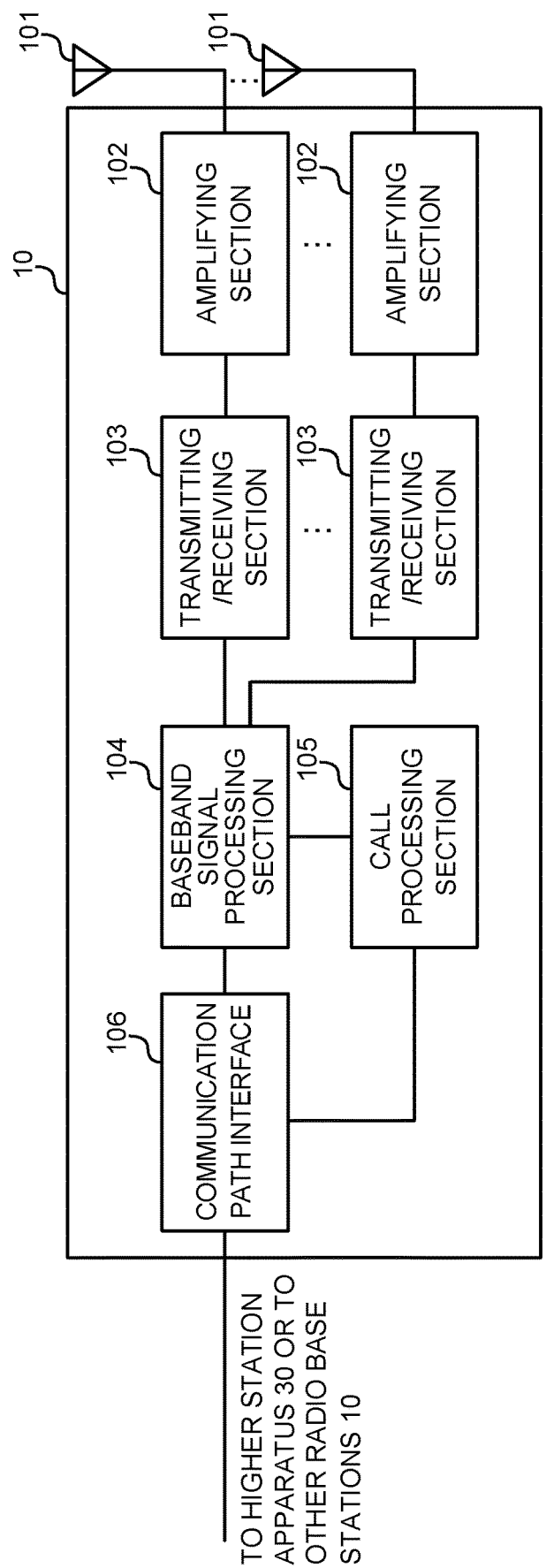
FIG. 3 is a diagram to show an exemplary overall structure of a radio base station according to one embodiment of the present invention.

FIG. 3 is a diagram to show an example of an overall structure of a radio base station according to one embodiment of the present invention. A radio base station 10 has a plurality of transmitting/receiving antennas 101, amplifying sections 102, transmitting/receiving sections 103, a baseband signal processing section 104, a call processing section 105, and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to transmission processes, including a PDCP (Packet Data Convergence Protocol) layer process, division and coupling of user data, RLC (Radio Link Control) layer transmission processes such as RLC retransmission control, MAC (Medium Access Control) retransmission control (for example, an HARQ transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up and releasing communication channels), manages the state of the radio base stations 10 and manages the radio resources.

The communication path interface section 106 transmits and receives signals to and from the higher station apparatus 30 via a predetermined interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

Note that the transmitting/receiving sections 103 may furthermore have an analog beamforming section that forms analog beams. The analog beamforming section may be constituted by an analog beamforming circuit (for example, a phase shifter, a phase shifting circuit, etc.) or analog beamforming apparatus (for example, a phase shifting device) that can be described based on general understanding of the technical field to which the present invention pertains. Furthermore, the transmitting/receiving antennas 101 may be constituted by, for example, array antennas.

The transmitting/receiving sections 103 may transmit signals using transmitting beams, or receive signals using receiving beams. Transmitting/receiving sections 103 may transmit and/or receive signals using predetermined beams determined by control section 301.

The transmitting/receiving sections 103 may transmit determining information for determining policies in autonomous selection of transmitting beams and the like, to the user terminals 20. In addition, the transmitting/receiving sections 203 may receive a report, from the user terminal 20, to the effect that there are no condition-fulfilling beams.

Figure 4:
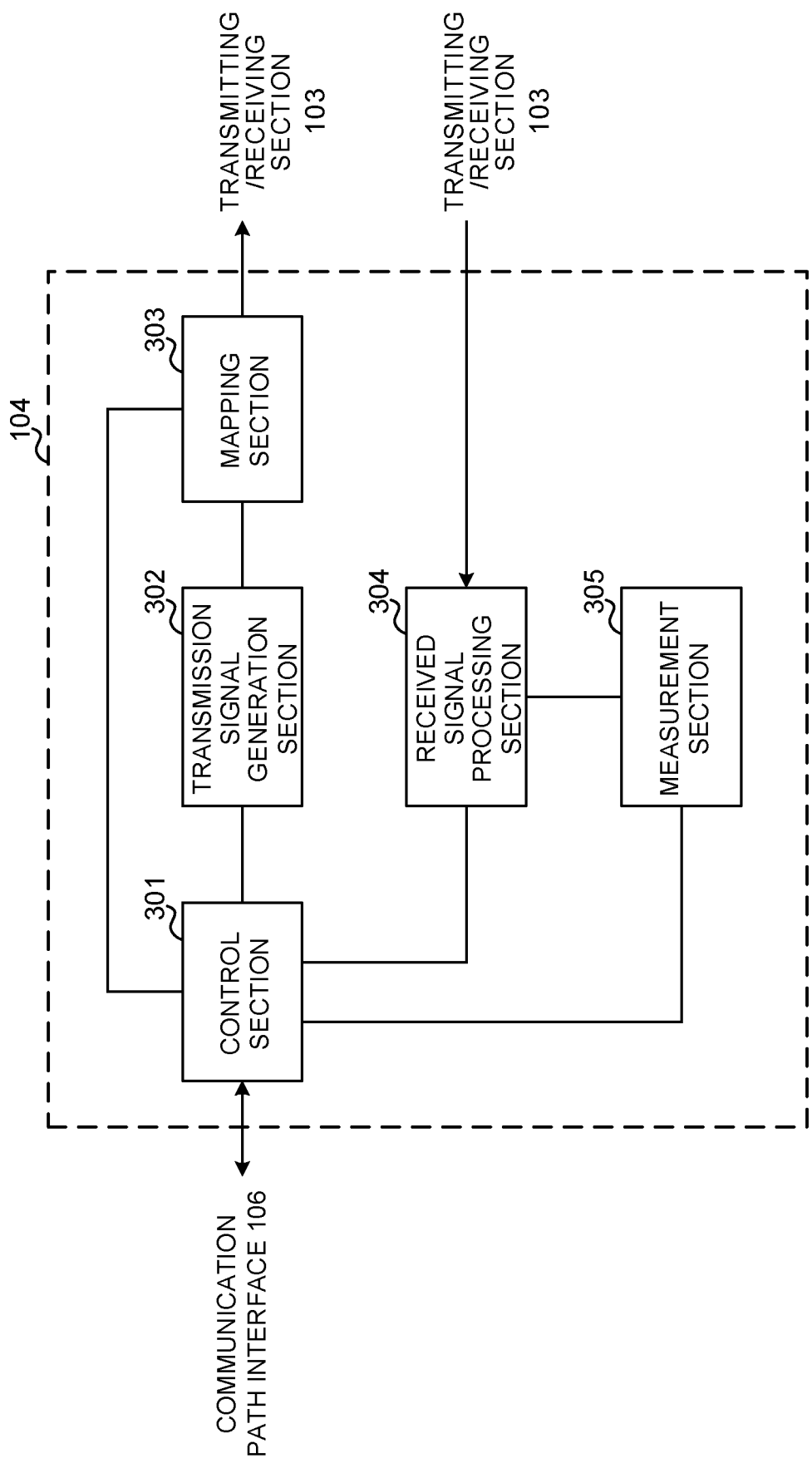
FIG. 4 is a diagram to show an exemplary functional structure of a radio base station according to one embodiment of the present invention.

FIG. 4 is a diagram to show an exemplary functional structure of a radio base station according to one embodiment of the present invention. Note that, although this example primarily shows functional blocks that pertain to characteristic parts of the present embodiment, the radio base station 10 has other functional blocks that are necessary for radio communication as well.

The baseband signal processing section 104 at least has a control section (scheduler) 301, a transmission signal generation section 302, a mapping section 303, a received signal processing section 304 and a measurement section 305. Note that these configurations have only to be included in the radio base station 10, and some or all of these configurations may not be included in the baseband signal processing section 104.

The control section (scheduler) 301 controls the whole of the radio base station 10. The control section 301 can be constituted by a controller, a control circuit or control apparatus that can be described based on general understanding of the technical field to which the present invention pertains.

The control section 301 controls, for example, generation of signals in the transmission signal generation section 302, allocation of signals in the mapping section 303, and so on. Furthermore, the control section 301 controls signal receiving processes in the received signal processing section 304, measurements of signals in the measurement section 305, and so on.

The control section 301 controls the scheduling (for example, resource allocation) of system information, downlink data signals (for example, signals transmitted in the PDSCH) and downlink control signals (for example, signals transmitted in the PDSCH and/or the EPDCCH, such as delivery acknowledgement information) and so on. Also, the control section 301 controls the generation of downlink control signals, downlink data signals and so on, based on the results of deciding whether or not retransmission control is necessary for uplink data signals, and so on. Also, the control section 301 controls the scheduling of synchronization signals (for example, the PSS (Primary Synchronization Signal)/SSS (Secondary Synchronization Signal)), downlink reference signals (for example, the CRS, the CSI-RS, the DMRS, etc.) and so on.

The control section 301 also controls the scheduling of uplink data signals (for example, signals transmitted in the PUSCH), uplink control signals (for example, signals transmitted in the PUCCH and/or the PUSCH, such as delivery acknowledgment information), random access preambles (for example, signals transmitted in the PRACH), and uplink reference signals.

The control section 301 may exert control so that transmitting beams and/or receiving beams are formed using digital BF (for example, precoding) in the baseband signal processing section 104 and/or analog BF (for example, phase rotation) in the transmitting/receiving sections 103. The control section 301 may exert control so that beams are formed based on downlink propagation path information, uplink propagation path information and so on. These pieces of propagation path information may be obtained from the received signal processing section 304 and/or the measurement section 305.

The control section 301 may exert control so that determining information, which is for allowing UE to determine policies (rules) in autonomous selection of beams using criteria, is transmitted to a user terminal 20. The control section 301 may also exert control so that determining information that allows the user terminal 20 to select, as a transmitting beam, a beam where the measurement result of a predetermined metric (for example, RSRP) fulfills a predetermined condition (as described with the first embodiment, for example), is transmitted.

The control section 301 may exert control so that information for specifying a predetermined metric, information as to which reference signal is to be measured, a threshold for a predetermined metric and so on are included in the above-described determining information and transmitted.

The transmission signal generation section 302 generates downlink signals (downlink control signals, downlink data signals, downlink reference signals and so on) based on commands from the control section 301, and outputs these signals to the mapping section 303. The transmission signal generation section 302 can be constituted by a signal generator, a signal generating circuit or signal generating apparatus that can be described based on general understanding of the technical field to which the present invention pertains.

For example, the transmission signal generation section 302 generates DL assignments, which report downlink data allocation information, and/or UL grants, which report uplink data allocation information, based on commands from the control section 301. DL assignments and UL grants are both DCI, and follow the DCI format. Also, the downlink data signals are subjected to the coding process, the modulation process and so on, by using coding rates and modulation schemes that are determined based on, for example, channel state information (CSI) from each user terminal 20.

The mapping section 303 maps the downlink signals generated in the transmission signal generation section 302 to predetermined radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminals 20 (uplink control signals, uplink data signals, uplink reference signals and so on). For the received signal processing section 304, a signal processor, a signal processing circuit or signal processing apparatus that can be described based on general understanding of the technical field to which the present invention pertains can be used.

The received signal processing section 304 outputs the decoded information acquired through the receiving processes, to the control section 301. For example, when a PUCCH to contain an HARQ-ACK is received, the received signal processing section 304 outputs this HARQ-ACK to the control section 301. Also, the received signal processing section 304 outputs the received signals and/or the signals after the receiving processes to the measurement section 305.

The measurement section 305 conducts measurements with respect to the received signals. The measurement section 305 can be constituted by a measurer, a measurement circuit or measurement apparatus that can be described based on general understanding of the technical field to which the present invention pertains.

For example, the measurement section 305 may perform RRM (Radio Resource Management) measurements, CSI (Channel State Information) measurements and so on, based on the received signals. The measurement section 305 may measure the received power (for example, RSRP (Reference Signal Received Power)), the received quality (for example, RSRQ (Reference Signal Received Quality), SINR (Signal to Interference plus Noise Ratio), SNR (Signal to Noise Ratio), etc.), the signal strength (for example, RSSI (Received Signal Strength Indicator)), propagation path information (for example, CSI), and so on. The measurement results may be output to the control section 301.

(User Terminal)

Figure 5:
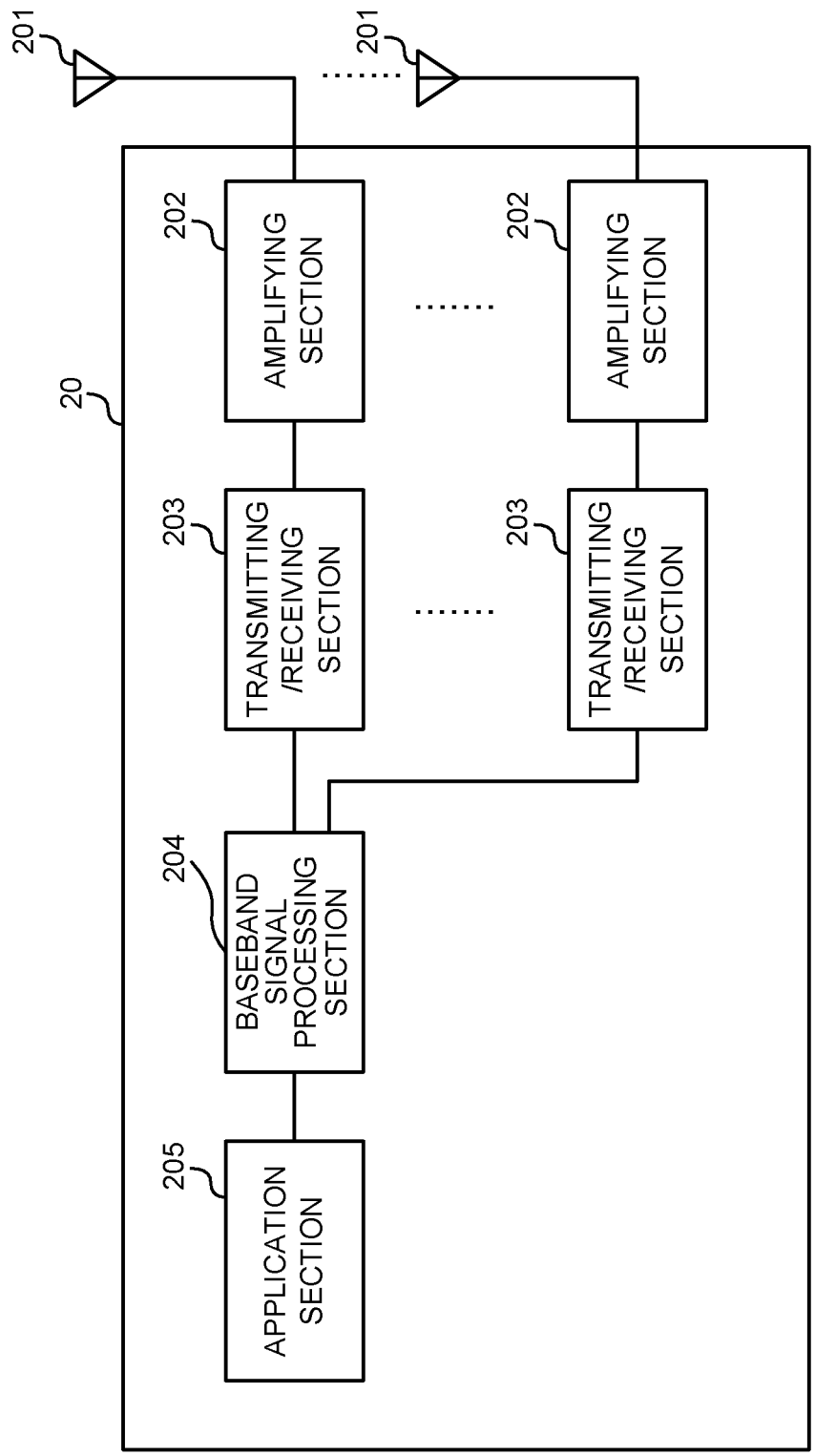
FIG. 5 is a diagram to show an exemplary overall structure of a user terminal according to one embodiment of the present invention.

FIG. 5 is a diagram to show an example of an overall structure of a user terminal according to one embodiment of the present invention. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

The baseband signal processing section 204 performs receiving processes for the baseband signal that is input, including an FFT process, error correction decoding, a retransmission control receiving process and so on. Downlink user data is forwarded to the application section 205. The application section 205 performs processes related to higher layers above the physical layer and the MAC layer, and so on. In the downlink data, the broadcast information can be also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving sections 203. Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

Note that the transmitting/receiving sections 203 may furthermore have an analog beamforming section that forms analog beams. The analog beamforming section may be constituted by an analog beamforming circuit (for example, a phase shifter, a phase shifting circuit, etc.) or analog beamforming apparatus (for example, a phase shifting device) that can be described based on general understanding of the technical field to which the present invention pertains. Furthermore, the transmitting/receiving antennas 201 may be constituted by, for example, array antennas.

The transmitting/receiving sections 203 may transmit signals using transmitting beams, or receive signals using receiving beams. The transmitting/receiving sections 203 may transmit and/or receive signals using predetermined beams determined by control section 401.

The transmitting/receiving sections 203 may receive determining information for determining policies in autonomous selection of transmitting beams, and so on, from the radio base station 10. Also, the transmitting/receiving sections 203 may transmit a report, to the radio base station 10, to the effect that there are no condition-fulfilling beams.

Figure 6:
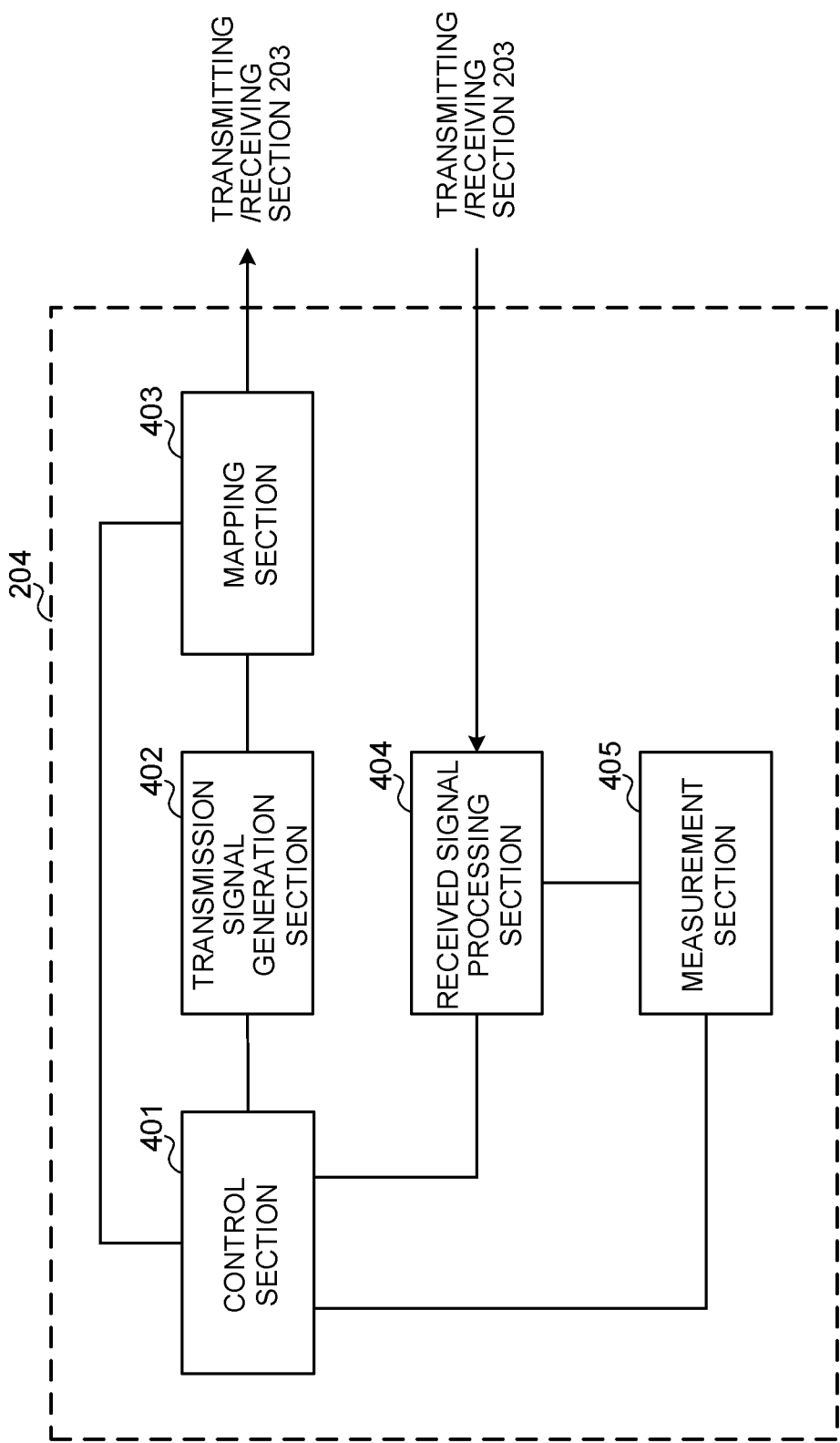
FIG. 6 is a diagram to show an exemplary functional structure of a user terminal according to one embodiment of the present invention.

FIG. 6 is a diagram to show an exemplary functional structure of a user terminal according to one embodiment of the present invention. Note that, although this example primarily shows functional blocks that pertain to characteristic parts of the present embodiment, the user terminal 20 has other functional blocks that are necessary for radio communication as well.

The baseband signal processing section 204 provided in the user terminal 20 at least has a control section 401, a transmission signal generation section 402, a mapping section 403, a received signal processing section 404 and a measurement section 405. Note that these configurations have only to be included in the user terminal 20, and some or all of these configurations may not be included in the baseband signal processing section 204.

The control section 401 controls the whole of the user terminal 20. For the control section 401, a controller, a control circuit or control apparatus that can be described based on general understanding of the technical field to which the present invention pertains can be used.

The control section 401, for example, controls the generation of signals in the transmission signal generation section 402, the allocation of signals by the mapping section 403, and so on. Furthermore, the control section 401 controls the signal receiving processes in the received signal processing section 404, the measurements of signals in the measurement section 405, and so on.

The control section 401 acquires the downlink control signals and downlink data signals transmitted from the radio base station 10, via the received signal processing section 404. The control section 401 controls the generation of uplink control signals and/or uplink data signals based on the results of deciding whether or not retransmission control is necessary for the downlink control signals and/or downlink data signals, and so on.

The control section 401 may exert control so that transmitting beams and/or receiving beams are formed using digital BF (for example, precoding) in the baseband signal processing section 204 and/or analog BF (for example, phase rotation) in the transmitting/receiving sections 203. The control section 401 may exert control so that beams are formed based on downlink propagation path information, uplink propagation path information, and so on. These pieces of propagation path information may be obtained from the received signal processing section 404 and/or the measurement section 405.

The control section 401 may select, as a transmitting beam, a beam where the measurement result of a predetermined criterion (for example, RSRP) fulfills a predetermined condition (for example, the conditions that have been described with the first embodiment may be used), based on determining information acquired from the received signal processing section 404. The transmitting beam may be a transmitting beam for a specific signal and/or channel.

Based on information that specifies a predetermined criterion, which is included in the determining information, the control section 401 may select a predetermined criterion (in other words, determine what the predetermined criterion is). In addition, the control section 401 may select a predetermined criterion based on which referfence signal is measured.

Based on a threshold for the predetermined criterion, included in the determining information, the control section 401 may select a beam where the measurement result of a predetermined criterion is equal to or higher than the threshold, or equal to or lower than the threshold, as a transmitting beam.

When there is no beam that fulfills the predetermined condition among the beams available to the user terminal 20, the control section 401 may exert control so that a report to the effect that no beam fulfills the condition is reported.

Note that the performance of autonomous selection of transmitting beams may be determined based on the indicator of whether the spread of a transmitting beam that is transmitted from the transmitting side (user terminal 20) on the receiving side (for example, radio base station 10) stays within a predetermined angle from the angle of arrival of this transmitting beam.

In addition, when various pieces of information reported from the radio base station 10 are acquired from the received signal processing section 404, the control section 401 may update the parameters used for control based on the information.

The transmission signal generation section 402 generates uplink signals (uplink control signals, uplink data signals, uplink reference signals and so on) based on commands from the control section 401, and outputs these signals to the mapping section 403. The transmission signal generation section 402 can be constituted by a signal generator, a signal generating circuit or signal generating apparatus that can be described based on general understanding of the technical field to which the present invention pertains.

For example, the transmission signal generation section 402 generates uplink control signals such as delivery acknowledgement information, channel state information (CSI) and so on, based on commands from the control section 401. Also, the transmission signal generation section 402 generates uplink data signals based on commands from the control section 401. For example, when a UL grant is included in a downlink control signal that is reported from the radio base station 10, the control section 401 commands the transmission signal generation section 402 to generate an uplink data signal.

The mapping section 403 maps the uplink signals generated in the transmission signal generation section 402 to radio resources based on commands from the control section 401, and outputs the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals include, for example, downlink signals (downlink control signals, downlink data signals, downlink reference signals and so on) that are transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The received signal processing section 404 outputs the decoded information, acquired through the receiving processes, to the control section 401. The received signal processing section 404 outputs, for example, broadcast information, system information, RRC signaling, DCI and so on, to the control section 401. Also, the received signal processing section 404 outputs the received signals and/or the signals after the receiving processes to the measurement section 405.

The measurement section 405 conducts measurements with respect to the received signals. The measurement section 405 can be constituted by a measurer, a measurement circuit or measurement apparatus that can be described based on general understanding of the technical field to which the present invention pertains.

For example, the measurement section 405 may perform RRM measurements, CSI measurements, and so on, based on the received signals. The measurement section 405 may measure the received power (for example, RSRP), the received quality (for example, RSRQ, SINR, SNR, etc.), the signal strength (for example, RSSI), propagation path information (for example, CSI), and so on. The measurement results may be output to the control section 401.

(Hardware Structure)

Note that the block diagrams that have been used to describe the above embodiments show blocks in functional units. These functional blocks (components) may be implemented in arbitrary combinations of hardware and/or software. Also, the method for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire or wireless, for example) and using these multiple pieces of apparatus.

Figure 7:
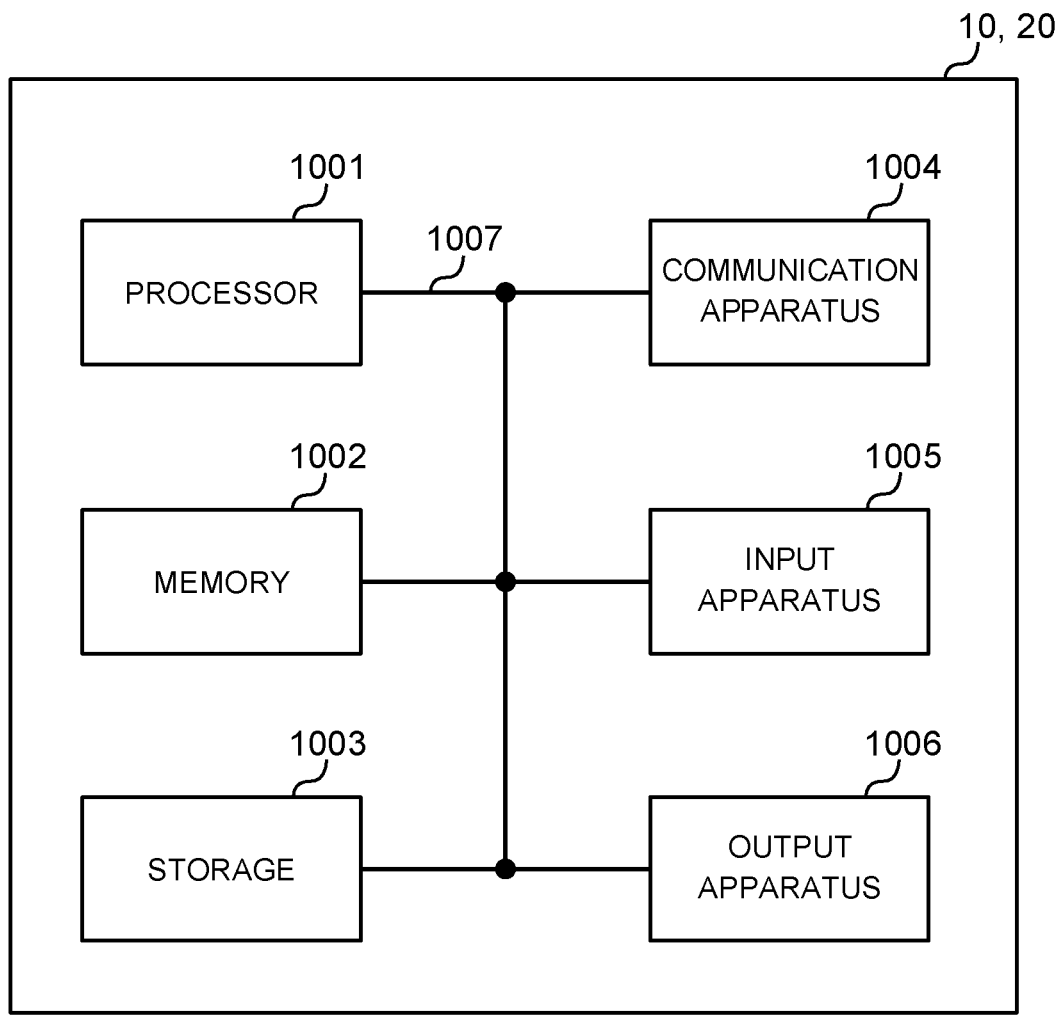
FIG. 7 is a diagram to show an exemplary hardware structure of a radio base station and a user terminal according to one embodiment of the present invention.

For example, the radio base station, user terminals and so on according to one embodiment of the present invention may function as a computer that executes the processes of the radio communication method of the present invention. FIG. 7 is a diagram to show an example hardware structure of a radio base station and a user terminal according to one embodiment of the present invention. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only one processor 1001 is shown, a plurality of processors may be provided. Furthermore, processes may be implemented with one processor, or processes may be implemented in sequence, or in different manners, on one or more processors. Note that the processor 1001 may be implemented with one or more chips.

Each function of the radio base station 10 and the user terminal 20 is implemented by reading predetermined software (program) on hardware such as the processor 1001 and the memory 1002, and by controlling the calculations in the processor 1001, the communication in the communication apparatus 1004, and the reading and/or writing of data in the memory 1002 and the storage 1003.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules or data, from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory" (primary storage apparatus) and so on. The memory 1002 can store executable programs (program codes), software modules and/or the like for implementing the radio communication methods according to one embodiment of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals" (or "signaling"). Also, "signals" may be "messages." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or more slots in the time domain. A subframe may be a fixed time duration (for example, 1 ms) not dependent on the numerology.

Furthermore, a slot may be comprised of one or more symbols in the time domain (OFDM (Orthogonal Frequency Division Multiplexing) symbols, SC-FDMA (Single Carrier Frequency Division Multiple Access) symbols, and so on). Also, a slot may be a time unit based on numerology. Also, a slot may include a plurality of minislots. Each minislot may be comprised of one or more symbols in the time domain. Also, a minislot may be referred to as a "subslot."

A radio frame, a subframe, a slot, a minislot and a symbol all represent the time unit in signal communication. A radio frame, a subframe, a slot, a minislot and a symbol may be each called by other applicable names. For example, one subframe may be referred to as a "transmission time interval" (TTI), or a plurality of consecutive subframes may be referred to as a "TTI," or one slot or mini-slot may be referred to as a "TTI." That is, a subframe and/or a TTI may be a subframe (1 ms) in existing LTE, may be a shorter period than 1 ms (for example, one to thirteen symbols), or may be a longer period of time than 1 ms. Note that the unit to represent the TTI may be referred to as a "slot," a "mini slot" and so on, instead of a "subframe."

Here, a TTI refers to the minimum time unit of scheduling in radio communication, for example. For example, in LTE systems, a radio base station schedules the radio resources (such as the frequency bandwidth and transmission power that can be used in each user terminal) to allocate to each user terminal in TTI units. Note that the definition of TTIs is not limited to this.

The TTI may be the transmission time unit of channel-encoded data packets (transport blocks), code blocks and/or codewords, or may be the unit of processing in scheduling, link adaptation and so on. Note that, when a TTI is given, the period of time (for example, the number of symbols) in which transport blocks, code blocks and/or codewords are actually mapped may be shorter than the TTI.

Note that, when one slot or one minislot is referred to as a "TTI," one or more TTIs (that is, one or more slots or one or more minislots) may be the minimum time unit of scheduling. Also, the number of slots (the number of minislots) to constitute this minimum time unit of scheduling may be controlled.

A TTI having a time duration of 1 ms may be referred to as a "normal TTI" (TTI in LTE Rel. 8 to 12), a "long TTI," a "normal subframe," a "long subframe," and so on. A TTI that is shorter than a normal TTI may be referred to as a "shortened TTI," a "short TTI," "a partial TTI" (or a "fractional TTI"), a "shortened subframe," a "short subframe," a "mini-slot," "a sub-slot" and so on.

Note that a long TTI (for example, a normal TTI, a subframe, etc.) may be replaced with a TTI having a time duration exceeding 1 ms, and a short TTI (for example, a shortened TTI) may be replaced with a TTI having a TTI duration less than the TTI duration of a long TTI and not less than 1 ms.

A resource block (RB) is the unit of resource allocation in the time domain and the frequency domain, and may include one or a plurality of consecutive subcarriers in the frequency domain. Also, an RB may include one or more symbols in the time domain, and may be one slot, one minislot, one subframe or one TTI in length. One TTI and one subframe each may be comprised of one or more resource blocks. Note that one or more RBs may be referred to as a "physical resource block (PRB (Physical RB))," a "subcarrier group (SCG)," a "resource element group (REG)," an "PRB pair," an "RB pair" and so on.

Furthermore, a resource block may be comprised of one or more resource elements (REs). For example, one RE may be a radio resource field of one subcarrier and one symbol.

Note that the structures of radio frames, subframes, slots, minislots, symbols and so on described above are merely examples. For example, configurations pertaining to the number of subframes included in a radio frame, the number of slots included in a subframe, the number of mini-slots included in a slot, the number of symbols and RBs included in a slot or a mini-slot, the number of subcarriers included in an RB, the number of symbols in a TTI, the symbol duration, the length of cyclic prefixes (CPs) and so on can be variously changed.

Also, the information and parameters described in this specification may be represented in absolute values or in relative values with respect to predetermined values, or may be represented using other applicable information. For example, a radio resource may be specified by a predetermined index.

The names used for parameters and so on in this specification are in no respect limiting. For example, since various channels (PUCCH (Physical Uplink Control CHannel), PDCCH (Physical Downlink Control CHannel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and output via a plurality of network nodes.

The information, signals and so on that are input and/or output may be stored in a specific location (for example, in a memory), or may be managed in a control table. The information, signals and so on to be input and/or output can be overwritten, updated or appended. The information, signals and so on that are output may be deleted. The information, signals and so on that are input may be transmitted to other pieces of apparatus.

Reporting of information is by no means limited to the aspects/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent implicitly (for example, by not reporting this piece of information, by reporting another piece of information, and so on).

Decisions may be made in values represented by one bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D (Device-to-Device)). In this case, user terminals 20 may have the functions of the radio base stations 10 described above. In addition, terms such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base stations may, in some cases, be performed by their upper nodes. In a network comprised of one or more network nodes with base stations, it is clear that various operations that are performed so as to communicate with terminals can be performed by base stations, one or more network nodes (for example, MMEs (Mobility Management Entities), S-GWs (Serving-Gateways) and so on may be possible, but these are not limiting) other than base stations, or combinations of these.

The aspects/embodiments illustrated in this specification may be used individually or in combinations, which may be switched depending on the mode of implementation. The order of processes, sequences, flowcharts and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication systems and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used herein only for convenience, as a method for distinguishing between two or more elements. In this way, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination of these. For example, "connection" may be interpreted as "access."

As used herein, when two elements are connected, these elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in the radio frequency, microwave and optical (both visible and invisible) regions.

In the present specification, the phrase "A and B are different" may mean "A and B are different from each other." The terms such as "leave" "coupled" and the like may be interpreted as well.

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The invention claimed is:

1. A terminal comprising:
a receiver that receives, by radio resource control (RRC) signaling, determining information including first information for specifying a criterion from at least one of power or quality-related indicators and second information for specifying a threshold for the criterion;
a processor that determines the criterion from the at least one of power or quality-related indicators based on the first information and determines, a beam having the criterion that is equal to or greater than the threshold based on the second information; and
a transmitter that transmits a random access preamble based on the beam determined,
wherein the processor determines the criterion from at least one of Reference Signal Received Power (RSRP), Reference Signal Received Quality (RSRQ), Received Signal Strength Indicator (RSSI), Signal to Interference plus Noise Ratio (SINR), Signal to Noise Ratio (SNR), pathloss, interference power, another power related indicator, and another quality related indicator.

2. The terminal according to claim 1, wherein the processor determines the criterion from the at least one of power or quality-related indicators based on what reference signal to use for measurement.

3. A radio communication method for a terminal comprising:
- receiving, by radio resource control (RRC) signaling, determining information including first information for specifying a criterion from at least one of power or quality-related indicators and second information for specifying a threshold for the criterion;
- determining the criterion from the at least one of power or quality-related indicators based on the first information;
- determining, a beam having the criterion that is equal to or greater than the threshold based on the second information; and
- transmitting a random access preamble based on the beam determined,
- wherein the terminal determines the criterion from at least one of Reference Signal Received Power (RSRP), Reference Signal Received Quality (RSRQ), Received Signal Strength Indicator (RSSI), Signal to Interference plus Noise Ratio (SINR), Signal to Noise Ratio (SNR), pathloss, interference power, another power related indicator, and another quality related indicator.

4. A base station comprising:
- a transmitter that transmits, by radio resource control (RRC) signaling to a terminal, determining information including first information for specifying a criterion from at least one of power or quality-related indicators and second information for specifying a threshold for the criterion; and
- a receiver that receives a random access preamble transmitted by the terminal based on a beam having the criterion that is determined from the at least one of power or quality-related indicators based on the first information and is equal to or greater than the threshold.

5. A system comprising:
- a terminal that comprises:
  - a receiver that receives, by radio resource control (RRC) signaling, determining information including first information for specifying a criterion from at least one of power or quality-related indicators and second information for specifying a threshold for the criterion;
  - a processor that determines the criterion from the at least one of power or quality-related indicators based on the first information and determines, a beam having the criterion that is equal to or greater than the threshold based on the second information; and
  - a transmitter that transmits a random access preamble based on the beam determined,
  - wherein the processor determines the criterion from at least one of Reference Signal Received Power (RSRP), Reference Signal Received Quality (RSRQ), Received Signal Strength Indicator (RSSI), Signal to Interference plus Noise Ratio (SINR), Signal to Noise Ratio (SNR), pathloss, interference power, another power related indicator, and another quality related indicator; and
- a base station that comprises:
  - a transmitter that transmits, by the RRC signaling to the terminal, the determining information; and
  - a receiver that receives the random access preamble transmitted by the terminal.

* * * * *